(12) United States Patent
Seller

(10) Patent No.: US 10,746,845 B2
(45) Date of Patent: Aug. 18, 2020

(54) METHOD AND SYSTEM OF TIMING AND LOCALIZING A RADIO SIGNAL

(71) Applicant: Semtech Corporation, Camarillo, CA (US)

(72) Inventor: Olivier Bernard André Seller, Sainte Soulle (FR)

(73) Assignee: Semtech Corporation, Camarillo, CA (US)

( * ) Notice: Subject to any disclaimer, the term of this patent is extended or adjusted under 35 U.S.C. 154(b) by 11 days.

(21) Appl. No.: 15/625,560

(22) Filed: Jun. 16, 2017

(65) Prior Publication Data

US 2018/0024224 A1 Jan. 25, 2018

(30) Foreign Application Priority Data

Jul. 20, 2016 (EP) .................................. 16180271

(51) Int. Cl.
*G01S 5/06* (2006.01)
*G01S 5/02* (2010.01)
*H04B 1/69* (2011.01)
*G01S 11/02* (2010.01)

(52) U.S. Cl.
CPC .............. *G01S 5/06* (2013.01); *G01S 5/0221* (2013.01); *G01S 11/026* (2013.01); *H04B 1/69* (2013.01); *H04B 2001/6912* (2013.01)

(58) Field of Classification Search
CPC ....... H04B 2001/6912; G01S 13/46–48; G01S 5/021–145; G01S 11/00–12
See application file for complete search history.

(56) References Cited

U.S. PATENT DOCUMENTS

| | | | | |
|---|---|---|---|---|
| 5,959,965 A * | 9/1999 | Ohkubo | .............. | H04L 27/2679 370/203 |
| 6,133,873 A * | 10/2000 | Krasner | ................ | G01S 5/0027 342/357.63 |
| 6,160,821 A * | 12/2000 | Dolle | ................... | H04L 27/2602 370/509 |
| 6,304,619 B1 * | 10/2001 | Citta | ........................ | H04B 1/69 375/139 |
| RE38,808 E * | 10/2005 | Schuchman | .................... | 340/7.2 |
| 8,976,060 B2 * | 3/2015 | Schaffner | ................ | G01S 11/04 342/118 |

(Continued)

FOREIGN PATENT DOCUMENTS

| | | | |
|---|---|---|---|
| EP | 2449690 A1 | 5/2012 |
| EP | 2767847 A1 | 8/2014 |

(Continued)

*Primary Examiner* — Jinsong Hu
*Assistant Examiner* — Rui M Hu
(74) *Attorney, Agent, or Firm* — Blank Rome LLP

(57) ABSTRACT

Method of timing, in a receiver, a radio signal generated in and transmitted from a transmitter, the radio signal comprising a series of frequency chirps, the system including: receiving the radio signal from the transmitter; synthesizing projection vectors comprising a series of frequency chirps that are a complex-conjugate image of those comprised in the radio signal the projection vectors being time-shifted relative to one another by determined shift intervals of time; multiplying the received radio signal by the projection vectors and accumulating the results; interpolating the accumulating results to determine a peak time shift.

8 Claims, 3 Drawing Sheets

(56) References Cited

U.S. PATENT DOCUMENTS

| | | | |
|---|---|---|---|
| 9,326,295 B1* | 4/2016 | Fay | H04L 5/0048 |
| 9,419,785 B1* | 8/2016 | Lin | H04L 27/2657 |
| 9,800,288 B2* | 10/2017 | Seller | H04W 56/0015 |
| 2003/0022651 A1* | 1/2003 | Bannasch | H04B 1/707 |
| | | | 455/307 |
| 2003/0043947 A1* | 3/2003 | Zehavi | H04B 1/7156 |
| | | | 375/365 |
| 2007/0286318 A1* | 12/2007 | Imahashi | H04L 7/007 |
| | | | 375/355 |
| 2008/0122692 A1* | 5/2008 | Houtman | G01S 19/29 |
| | | | 342/357.68 |
| 2008/0309543 A1* | 12/2008 | Schaffner | H04B 1/7183 |
| | | | 342/21 |
| 2009/0225918 A1* | 9/2009 | Telukuntla | H04W 56/0035 |
| | | | 375/360 |
| 2011/0064119 A1* | 3/2011 | Sforza | H04B 1/69 |
| | | | 375/139 |
| 2011/0274220 A1* | 11/2011 | Andgart | G01S 5/0221 |
| | | | 375/342 |
| 2012/0300814 A1* | 11/2012 | Schaffner | G01S 11/04 |
| | | | 375/139 |
| 2013/0051433 A1* | 2/2013 | Hiscock | H04B 1/69 |
| | | | 375/139 |
| 2013/0129026 A1* | 5/2013 | Petersen | G01S 11/08 |
| | | | 375/371 |
| 2014/0064337 A1* | 3/2014 | Hiscock | H04B 1/69 |
| | | | 375/139 |
| 2014/0266914 A1* | 9/2014 | Schwartz | G01S 5/14 |
| | | | 342/463 |
| 2015/0270866 A1* | 9/2015 | Schaffner | H04B 1/69 |
| | | | 375/139 |
| 2019/0149187 A1* | 5/2019 | Paquelet | H04L 27/14 |
| | | | 375/139 |

FOREIGN PATENT DOCUMENTS

| | | |
|---|---|---|
| EP | 2767848 A1 | 8/2014 |
| WO | WO-00/02325 | 1/2000 |

\* cited by examiner

METHOD AND SYSTEM OF TIMING AND LOCALIZING A RADIO SIGNAL

REFERENCE DATA

The present application claims priority from European Patent Application EP16180271.5 of Jul. 20, 2016, the contents whereof are incorporated by reference in their entirety.

FIELD OF THE INVENTION

The present invention relates, in embodiments, with systems and methods for determining with precision the time of arrival (TOA) of a radio signal to a receiver and, by combining precise determinations of the time of arrival at different sites, the localization of the radio transmitter.

BACKGROUND

Thanks to the recent improvements in microelectronics and communication systems, a large number of devices and objects have been embedded with electronics, software sensor, and connectivity means that allow them to collect and exchange information. This network of objects, is called the Internet of Things, or IoT.

IoT objects are often simple devices with modest energy resources, as they must rely on local accumulators or energy harvesting. They need therefore wireless connectivity solutions that agree with these conditions.

Low-throughput long-distance wireless networks are particularly suited to applications in the IoT, in particular where low power, long battery autonomy and low cost are sought. The LoRa communication system, known among others by patent applications EP2767847 and EP2449690, uses chirp spread-spectrum modulation to achieve these goals.

Localization is one of the key enablers for the development of the Internet of Things. There is a need for low-power, low-complexity localization methods and devices for mobile nodes.

Satellite localization systems are known since a considerable time. GP, Glonass and Galileo allow precise self-localization of mobile nodes, based on the precise timing of signals received from a constellation of space vehicles whose orbits are precisely known.

Although these systems have been extremely successful in many ways, they are not so well suited to the low-power range segment of the IoT. In particular the initial acquisition of the signals demands a considerable computing power, and indoor reception is still very difficult. Terrestrial or maritime localization systems based on the timing of radio signals are also known, predating the satellite-systems, and are still used today.

Radio-based localization often derives the position of an object from the measured times of arrival of a radio signal linking the object to some reference whose position is known. In the LoRa system, the time of arrival of a signal can be determined with methods that exploit the duality between time and frequency in chirp-modulation, as known from EP2767848 and EP2767847.

Both device-side localization and network-side localization methods are known in the art. In device-side localization, which is the variant used, for example in GPS, the device itself receives the radio signals from a number of beacons and, by timing them, determines the ranges to the beacons and its own location, without further external assistance whereas, in network-side localization, the device whose position is requested sends one or several signals that is received from a plurality of fixed stations, belonging to the network infrastructure. The ranges and the location are computed in the network infrastructure.

Both methods have advantages and shortcomings. Network-side localization, however, transfers most of the computations in the networks structure, which allows a simplification of the end node's hardware. Network-side localization permits the localization of transmit-only nodes and is harder to jam than the device-side variant, which is an advantage in security applications.

Both variants of localization, however, depend on determining accurately the time of arrival of radio signals. Multipath is ever present in real communication channels and it degrade the accuracy of timing. There is therefore a need of methods and systems for timing a radio signal that is more robust to multipath than the ones of the state of the art.

Timing a radio signal often involves determining its position on an absolute time axis, determined by an accurate clock, for example a GPS-disciplined clock, or the time difference of arrival between two similar signals. In both cases, the larger the bandwidth of the signal, the easier the localization will be. While a zero-bandwidth CW signal has no time structure and is essentially impossible to time precisely, radar system achieve excellent timing by using very short broad bandwidth radio pulses.

LoRa is a spread spectrum modulation. Its bandwidth, however, is relatively small: about 125 kHz in most cases, in contrast with radar systems that use some tens of MHz up to several GHz of bandwidth. Therefore, the techniques derived from radar applications are not really effective for LoRa signals. In particular, LoRa signals last much longer, and the structure of the signals does not allow resolving multipath in the time domain.

Effective localization requires in general a time-of-arrival accuracy of 30 to 300 ns, depending on the propagation conditions and on the precision sought for. With a bandwidth of 125 kHz, the Nyquist sampled data has a resolution of 8 microseconds, about 250 times larger than the target resolution.

Since LoRa is chirp-based spread spectrum modulation, the time of arrival can be estimated from the frequency of the incoming signal which, due to multipath, will be a superposition of several complex exponential signals. Algorithms to extract individual components from such a superposition are known, for example the super-resolution MUSIC algorithm. These methods, however, are computationally very intensive, particularly, in our case, where the vectors can be very long, and the number of multipath components is not known in advance.

US2014064337 and WO0002325 describe receivers using chirps for synchronization.

SHORT DESCRIPTION OF THE INVENTION

The present invention proposes methods of timing a radio signal in a receiver and of positioning a device that are the object of the corresponding independent claims.

SUMMARY OF THE FIGURES

FIG. 2 is a plot of the instantaneous frequency of a base chirp and of a modulated chirp according to one aspect of the present invention. The phases of the same signals are plotted in FIG. 3, while

DETAILED DESCRIPTION OF EMBODIMENT(S)

Recall of LoRa Modulation

Several aspects of the chirp modulation technique employed in the present invention are described in European Patent Applications EP2449690 and EP2767848, which are hereby incorporated by reference, and will be reminded here summarily.

Figure 1:
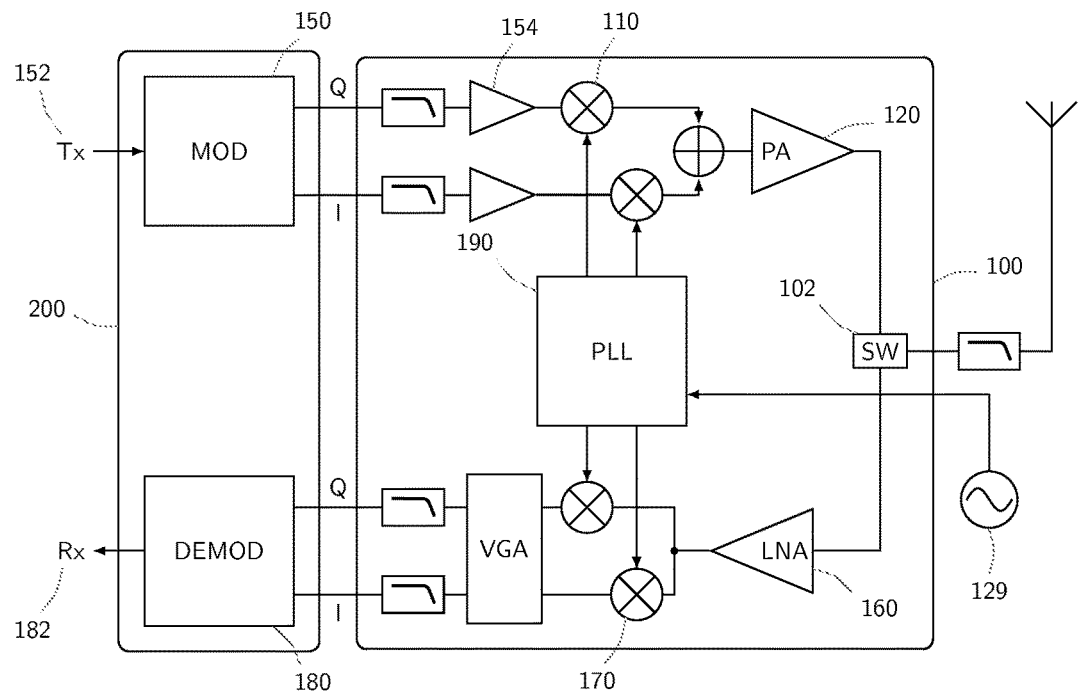
FIG. 1 illustrates schematically the structure of a node of a wireless network compatible with the present invention.

The radio transceiver that is represented schematically in FIG. 1 is part of a possible embodiment of the invention. It includes a baseband section 200 and a radiofrequency section 100. Concentrating on the transmitter part, the baseband modulator 150 generates, based on the digital data 152 that are present at its input, a baseband signal whose I and Q component are converted to the desired transmission frequency by the RF section 100 amplified by the power amplifier 120, and transmitted by the antenna. This architecture allows several variants and modifications without departing from the frame of the invention, and is a non-limiting example. For example, the transceiver could synthesize the polar components amplitude A and phase $\phi$, rather than the Cartesian ones I and Q.

The conversion of the signal from the baseband to the intended frequency is done, in this example, by mixing in mixer 110 the signal provided by amplifiers 154 with the in-phase and quadrature components of a local carrier generated by circuit 190, and linked to a reference clock 129.

Once the signal is received on the other end of the radio link, it is processed by the receiving part of the transceiver of FIG. 1 comprises a low noise amplifier 160 followed to a down-conversion stage 170 that generates a baseband signal comprising a series of chirps, that is then processed by the baseband demodulator 180, whose function is the reverse of that of the modulator 150, and provides a reconstructed digital signal 182.

As discussed in EP2449690, the modulator 150 synthesizes a baseband signal that comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention. The chirps can be described by the time profile f(t) of their instantaneous frequency or also by the function $\phi(t)$ defining the phase of the signal as a function of the time. Chirps may have one of a plurality of different profiles, each corresponding to a symbol in a predetermined modulation alphabet.

Figure 2:
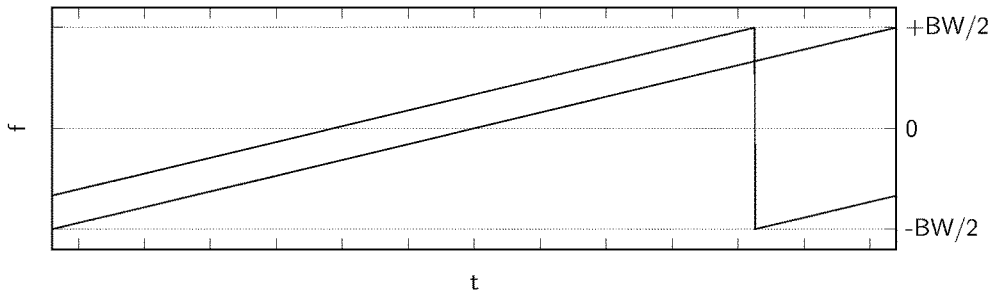
Figure 3:
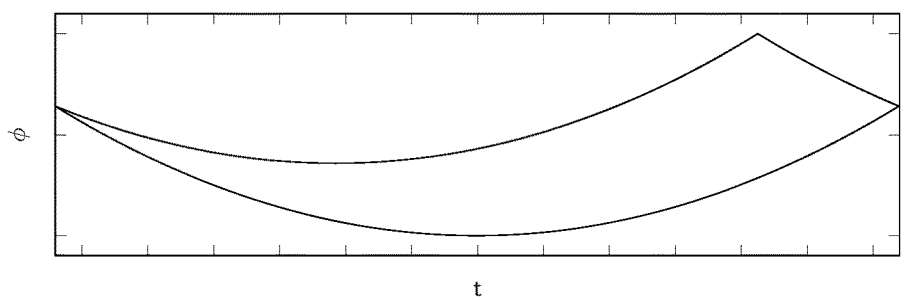
Figure 4:
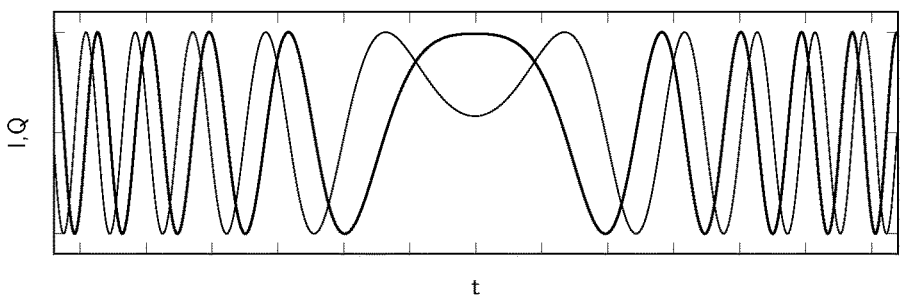
FIG. 4 is a plot of the real and of the complex component of the unmodulated base chirp, in the time domain.

Importantly, the chirps comprised in the signal can be either base chirp (also called unmodulated chirps) that have specific and predefined frequency profile, or one out of a set of possible modulated chirps, obtained by time-shifting cyclically the base chirp's frequency profile. FIGS. 2-3 illustrate possible frequency and phase profiles of a base chirp and of a modulated one, while FIG. 4 shows the real and imaginary components I, Q, of an unmodulated chirp in the time domain. The bandwidth BW of the modulated signal is thus determined by the difference between the highest and the lowest frequencies in the chirp and is the same in modulated and unmodulated chirps. FIG. 2 represents a baseband signal whose bandwidth extends between −BW/2 and BW/2 but, of course, the transmitted signal will be converted to a suitable frequency band.

In the example depicted, the frequency of a base chirps increases linearly from an initial value $f_0=-BW/2$ at $t=t_0$ to a final value $f_1=BW/2$ at $t=t_1$, where BW stands for the amount of bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol.

Preferably, LoRa receivers and transmitters are also arranged to synthesize and insert in the signal conjugate chirps, that are complex-conjugate of a base unmodulated chirp. One can regard these as down-chirps in which the frequency falls from a value of $f_0=+BW/2$ to $f_1=-BW/2$. Preferably, the phase of the chirps is described by a continuous function $\phi(t)$ that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. The demodulator unit 180 in the receiver can align its time references with that of the transmitter, and determine the amount of cyclical shift imparted to each chirp. The operation of evaluating a time shift of a received chirp with respect to a local time reference can be carried out by multiplying the received chirp by a complex conjugate of a locally-generated base chirp, and performing a Fourier transform. The position of the maximum of the Fourier transform is indicative of the shift, and of the modulation value. Other dechirping methods are possible. The operation of multiplying a chirp signal by the conjugate of a base symbol be referred to in the following as "dechirping", and the following Fourier transform as "demodulation".

Thus, "cyclic shift value" may be used in the following to indicate the modulation in the time domain, and "modulation position", or "peak position" represent the same in the frequency domain. We will denote with N the length of the symbol or, equivalently, the spreading factor, with 1/BW the Nyquist sampling frequency and with N/BW the length of a symbol. Preferably, N is a power of two. In a possible application, BW might be 125 KHz, and N equal to 4096, 2048, 1024, 512, 256, 128, 64, or 32. The carrier frequency may be in the European 868 MHz ISM band, or the US 915 MHz ISM band.

Hence, a modulated symbol is a cyclic shift of the base symbol, of any number between 0 and N−1. A modulation value of 0 is equivalent to the absence of modulation. Since N is a power of two, the value of the cyclic shift can be coded over $\log_2(N)$ bits.

Preferably, the signal transmitted and received by the invention are organized in frames that include a preamble and a data section, suitably encoded. The preamble and the data section comprise a series of chirps modulated and/or unmodulated, that allow the receiver to time-align its time reference with that of the transmitter, retrieve information, perform an action, and so on. Several structures of frame are possible.

FIG. 4 represents schematically a possible structure of a frame that may include a data packet and/or a ranging request. This structure has a preamble that is functional to the demodulation of the message and to the compensation of several drift sources, as it will be explained better later on. The header part of the frame is a data field 415 that includes an indication of the frame purpose, and an identification address of the specific recipient device.

Figure 6:
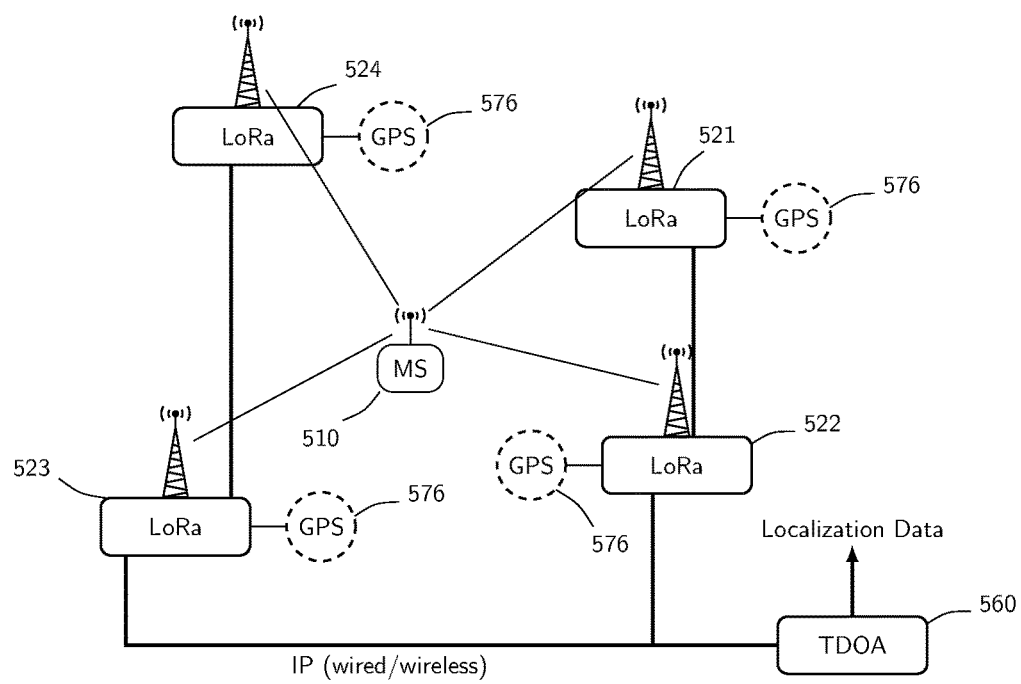
FIG. 6 presents schematically the positioning system of the invention.

FIG. 6 represents a possible architecture of a localization system according to the invention. A mobile station 510 is equipped with a LoRa transmitter and broadcasts a message that is received by a plurality of LoRa receivers 523. Each of the receivers 523 has access to a synchronised clock 576 that is synchronised with the clocks of all the other receivers 524, such that each receiver can determine the time of arrival of radio signals based on a common time reference. Clock synchronization can be obtained by any suitable known means. In a possible implementation, the clocks 576 may be GPS-disciplined units.

Upon reception of a LoRa signal from the mobile station 510, each of the receivers 523 "timestamps" it with its time of arrival computed on the synchronised clock, and the timestamps are made available to a solver 560 that determines, in known manner, the position of the mobile station 510 based on the times of arrival encoded on the timestamps, and on the known positions of the receivers 523. Importantly, once the signals have been timestamped in the receivers, the actual calculation of the location can be deferred and/or conditioned. In the figure, the solver 560 is represented as a remote server but the determination of the location could be carried out in any of the infrastructure nodes 524, in a mobile node, or in any suitable computing unit.

Central to the invention is the manner of timing, or "timestamping" the signals in the receivers, these terms indicating the act of determining and storing the precise time of arrival of the signal at the receiver, based on a suitable reference clock. In the frame of the invention, this may include all or some of the following operations:

Coarse Synchronization

Coarse synchronization is the operation of synchronising the signal received by receivers 521-524 and the signal synthesized by the transmitter 510 at the level of the respective digital samples. To make an example, in a typical LoRa signal the baseband signal will be sampled by a sampling frequency $f_s$=125 kHz and each symbol, i.e. each chirp, includes from 128 to 4096 samples. Each sample has a duration of 8 µs which correspond to a signal's propagation distance of 2.4 km.

Figure 5:
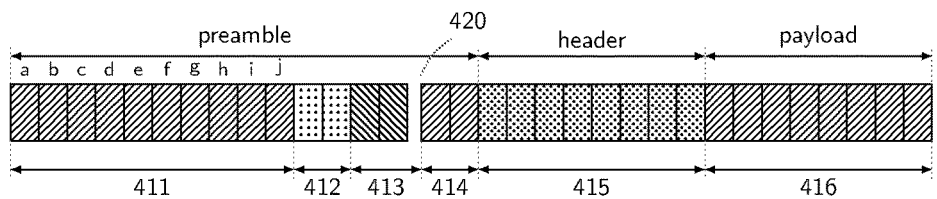
FIG. 5 represents schematically the structure of a frame according to an aspect of the present invention.

Coarse synchronization can be carried out by several known methods, including the processing of the detection symbols 411 in the preamble (see FIG. 5). It is a sequence of base (i.e. un-modulated, or with cyclic shift equal to zero) symbols. The detect sequence 411 is used in the receiver to detect the beginning of the signal and, preferably, perform a first synchronization of its time reference with the time reference in the transmitter. By dechirping the detect sequence, the receiver determines a shift amount.

Frame Synchronization

Frame synchronization is the operation of determining the correspondence between the samples and symbols in the frame. If, as it may be the case, the preamble 411 comprises 16 unmodulated chirps, frame synchronization amount to locating the frame boundaries in the received sampled signal, i.e, which interval of samples belongs to symbol 0, which to symbol 1, and so on.

The end of the detect sequence is marked by one or more, preferably two, frame synchronization symbols 412 that are chirps modulated with predetermined values, for example a first chirp with a modulation value of 4, and a second one with the opposite modulation N−4. Preferably, the modulation of the frame synchronization symbols is larger, in absolute shift, than three units to minimize the likelihood of errors. The use of a single modulated symbol as frame synch marker or of the same modulation value for several symbols are also possible, but not optimal.

Frequency Synchronization

Due to time-frequency duality in chirps, any drift between the frequencies of the time bases in the receiver and in the transmitter will result in an error in the determination of the time of arrival. The relation between time and frequency involves the slope of the frequency chirps and, for a typical LoRa signal having N=1024 samples per chirp and a bandwidth of 125 kHz, the frequency step between samples, is 122 Hz. Therefore, a frequency drift of 122 Hz will translate into a time shift of one sample period or 8 µs, alias 2.4 km in terms of distance.

While the clocks 576 of the receivers sport excellent precision and stability, the mobile nodes 510 tend to be low-cost devices and are equipped with inferior clocks, whose frequency can drift due to changes in temperature, aging, driving level, and many other perturbing factors. Slight frequency drifts do not necessarily inhibit demodulation of the LoRa signals. They may increase the error rate, however, and have a very negative influence on ranging and localization. For these reasons, the receivers 521-524 are preferably arranged for determining and modelling the frequency drift of the transmitter from the received signal.

According to another aspect of the invention, the preamble includes preferably frequency synchronization symbols 413 that consist in one or more, preferably two chirps that are complex conjugate of the base unmodulated chirp. The conjugate symbols may be replaced by chirps that have a different bandwidth or duration than the base chirps, thus exhibiting a frequency variation that is faster, or slower than that of the base chirps. This variant would require a more complex receiver, but, on the other hand, leaves the conjugate-chirps free to use for data transmission. The apparent value of modulation will give the frequency error, due to the time-frequency duality of chirps. To let the receiver align in time, a silence 420 is inserted after the symbols 413.

Other methods of determining the frequency drift are however possible.

Temporary Storage

After coarse synchronization, frame synchronization, and frequency synchronization are completed, the receiver of the invention proceeds to determine the time of arrival, as it will be detailed. The invention exploit the direct relationship between time and frequency that exists in chirp signals and determines the time of arrival from frequency shift.

Preferably, the received digital signal is stored in a suitable memory area, and the precise timing is performed on the memorized signal. Since the sampling of the signal is synchronous with the precise clock 576, the precision of the GPS clock is transferred to the samples, and the time of arrival can be determined with the required precision. In the following example, the timing is done on the preamble's detection section 411, as working with unmodulated data is simpler. It must be understood, however, that this feature does not limit the invention. The method of timing would be possible in fact on any sequence of symbols whose modulation values are known. The storage can be done after frame and frequency synchronization and, preferably the full length of the preamble is stored.

Precise Timing

The goal of the precise timing is determine the time of arrival of the signal with a precision that is adequate for localization purposes, that is with an error of about 4 ns. This may involve several steps.

A first operation that improves timing is fine timing drift compensation. As already mentioned, the frequencies of the transmitter's time base and of the receiver's one are not perfectly the same, and the frequency synchronization explained above allows estimating the amount of error. This can be corrected for improved accuracy. When the timing of the signal is extracted by way of dechirping, frequency drift can be compensated by adjusting slopes, initial frequency, and phase of the conjugate chirp that is synthesized locally. The chirp slope adjustment is proportional to the estimated frequency error, and can be constant for all symbols or, if needed, adapted for each symbol. The chirp initial frequency is offset by an amount that is proportional to the accumulated timing error that is increased progressively at each symbol by a step that is proportionally to the estimated frequency error. Lastly, the phase can be adjusted, such that the inter-symbol phase continuity is preserved. Since LoRa preamble signals are relatively long, (up to 250 ms), timing drift compensation allows coherent processing of the whole preamble, or at least of a large part of it, and helps improving the timing precision.

To give some non-limiting but explicative figures, the typical specification for the endpoint crystal error is ±30 ppm, and ±1.5 ppm for the base-stations. This means that without compensation and after 250 ms, the maximum timing error between endpoint and gateway can be 250 ms×31.5 $10^{-6}$=8 μs, Between base stations the worst error can be of 250×3 $10^{-6}$=0.75 μs, which still corresponds to 225 meters at the speed of light. More importantly, without correct timing drift compensation, the phase coherence between symbols is lost, so the fine frequency error estimation is not possible, leading to errors of up to ½×125 KHz which corresponds to 1200 meters.

Timing drift compensation can be obtained also by interpolating the received signal, but this is more expensive computationally.

A second useful operation is fine time synchronization. The initial time synchronization correspond to a time synchronization at the end of the preamble but, due to the frequency drift, it is not possible to synchronise exactly the whole of the preamble without a refinement that consists in applying the timing drift compensation to a symbol, then computing again a timing difference by a dechirp operation. Normally a little number of spectral coefficient (3 or 5, for example) are computed around the 0 position, because the residual misalignment is expected to be small, and the peak of the Fourier transform is determined by interpolation. This is carried over the detection part 411 of the preamble.

Another useful correction is a refined frequency synchronization. Thanks to coarse frequency estimation, we have a good sampling error compensation. This allows a linear reception of the preamble: the phase information after dechirp and FFT—or DFT on selected bins—can be used. In this step, we either save the phase of highest energy bins from last step, or compute again this DC bin on each symbol, after timing compensation and refined time synchronization. From the phase of these values, a residual frequency error is estimated. The sum of coarse frequency error and residual frequency error is the refined frequency error estimation. The detection section of preamble can be up to 10 symbols, and there is enough processing gain to detect a 5 degrees variation of phase between first and last symbol, even at the lower boundary of sensitivity.

Assuming a spread factor SF12 and a 125 KHz bandwidth, this translates into a frequency accuracy of (5/360)/(10×4096)×125·$10^3$=0.04 Hz. At a spread factor SF7, the accuracy would drop to 1.4 Hz, still enough to detect a Doppler shift corresponding to a speed of 2 Km per hour. Therefore, since the receivers' time base are precisely synchronised by GPS, it is possible to estimate the velocity vector of the mobile source 510 from the refined frequency synchronization determined at the base stations.

To determine the frequency shift, the receiver synthesizes a first projection vector for dechirping the detect sequence 411. Preferably, the projection vector is adapted on a symbol-by-symbol basis in order to compensate for the instantaneous frequency of the transmitter's clock, as determined in the frequency synchronization. This means that the first projection vector is composed of a series of conjugate chirps (i.e. down-chirps if the base chirps are up-chirps) whose slopes are slightly adapted to correspond to the instantaneous frequency of the transmitter. The consequence of this adaptation is, that the single chirps are not exactly identical and that the overall phase of the first projection vector is not strictly continuous: there will be little discontinuities at symbol boundaries.

Figure 7:
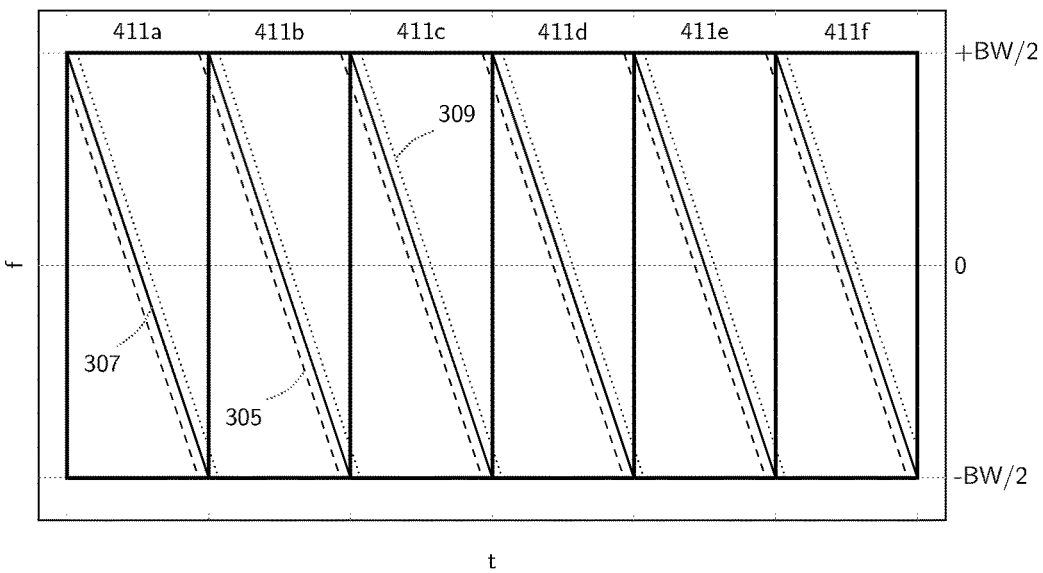
FIG. 7 illustrates an aspect of the present invention, namely the construction of the projection vectors

FIG. 7 plots the instantaneous frequency profile of a part of the first projection vector 307. Individual symbol corrections are not appreciable at this scale. Preferably, the receiver synthesizes also an advanced projection vector 305 and a delayed projection vector 309 that are a time-shifted copy of the first vector. The time shift in FIG. 7 is greatly exaggerated, and usually amounts to one sample (8 μs) or a few samples. In scale, the shift could be ¹⁄₁₂₈th or ¹⁄₄₀₉₆th of the width of a symbol. The invention is not limited to three projection vectors, however: a larger number could be synthesized.

The projection of the received signal along any of the projection vectors is the accumulated sum of the product of the corresponding samples (an inner product). Compared to the standard dechirping process, which involves multiplying the input vector by one conjugate chirp and then performing a Fourier Transform, this projection yields only the first complex coefficient of the transform. The projections along the advanced and retarded vectors provide the nearby coefficients. One obtains in this manner, an information on the very first coefficients of the Fourier transform.

As in the ordinary dechirping, the time shift is given by the peak's position in the spectrum of the signal multiplied by the conjugate. After the preliminary synchronization, it is expected that the time shift be less than one sampling period. Therefore, the knowledge of the three lowest-frequency spectral components is in general sufficient for determining the peak position by interpolation.

Thus, multiplying and accumulating the received signal by several, slightly shifted, projection vectors can be regarded as a convenient manner to extract the spectral information of interest without performing a full Fourier transform. It is clear, however, that this is not the same manner of carrying out the invention: other mathematically equivalent algorithms exist and are included in the invention.

Multipath

The above-outlined method allows the determination of a frequency difference of the order of a few Hz between the received signal and the local one, which is adequate for precision synchronization. Still, the inventor have frequently observed that the determination is less reliable in presence of multipath. The reason is that the received signal is in fact a superposition of different exponentials, one for each path.

It has been found advantageous to use only a part of the available bandwidth to compute the timestamp in condition of multipath. The reason of this apparent contradiction is that, when multipath severely degrades the reception, there often is a destructive interference between competing paths. In this situation, there will be a frequency $f_d$ (see FIG. 8) in the bandwidth at which the signal almost exactly cancels. The channel response is smooth and exhibits a low derivative absolute value, because the signal bandwidth is lower than the channel coherence bandwidth. Therefore, when the channel response amplitude is close to zero, its phase essentially switches sign at this frequency. The effect is to reduce and potentially cancel completely the inner product: the portion above this frequency will he in phase opposition to the portion below.

Figure 8:
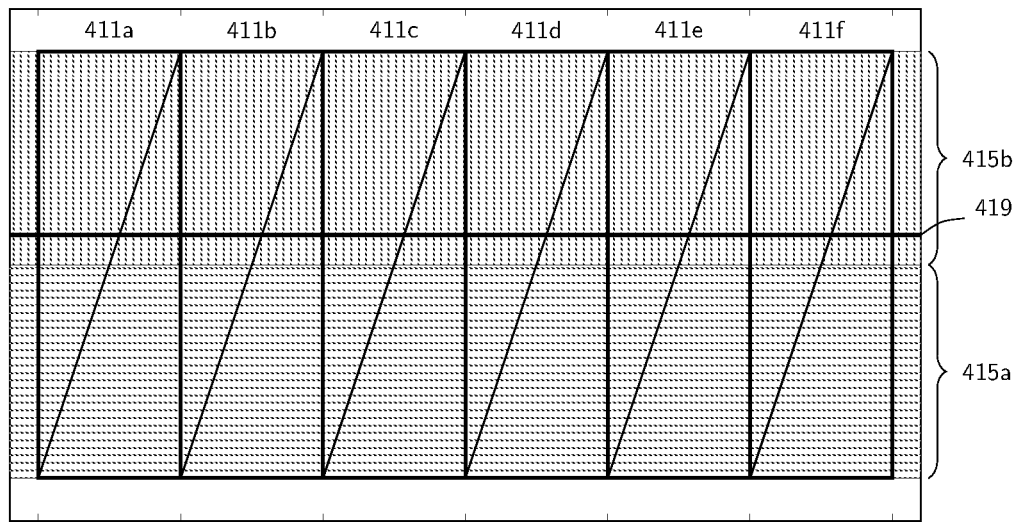
FIGS. 8 and 9 illustrate a division of the reception band in sub-bands according to an aspect of the invention.

FIG. 8 illustrates this situation. The line 419 indicates a frequency at which two path interfere destructively. The invention addresses this situation by dividing the whole bandwidth in sub-bands 415a, 415b and performing the timing process in each sub-band separately. This can be done by slicing the input buffer in time segments, or by selectively nulling portions of the projection vectors.

Each sub-band provides an independent determination of the time of arrival. Very often, these partial measures are superior to the timing that can be obtained on the whole band. The reason being that, the destructive interference introduces a change of sign in the phase, and the degradation on the timing is maximal when the frequency of maximal interference is in the centre of the band. Since the signal bandwidth is lower than the channel coherence bandwidth, it is highly unlikely to experience more than one phase inversion within a symbol.

In the situation of FIG. 8, sub-band 415a yields a better timing than the whole bandwidth, because the frequency of destructive interference f=$f_d$ is excluded, but sub-band 415b is also better than the whole bandwidth, because the frequency of destructive interference is near to a boundary and far from the centre of the sub-band.

Figure 9:
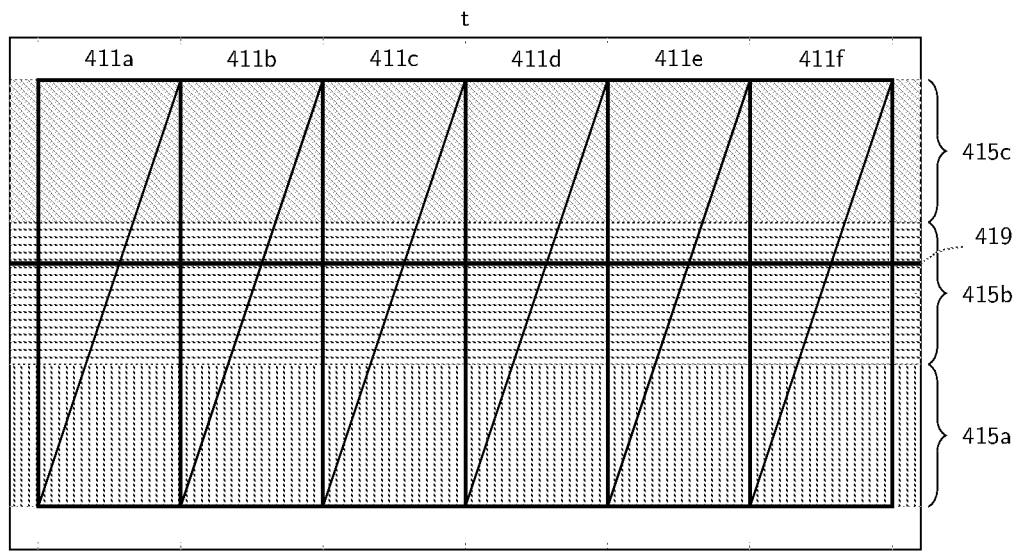

It is also possible, in the frame of the invention, to divide the bandwidth in more than two sub-bands and/or reject the sub-bands in which the multipath is heavier. This can be decided by observing the signal intensity, or from a statistics analysis of timing dispersion, or by any other suitable means. In the example of FIG. 9, sub-bands 415a and 415c exclude the frequency f=$f_d$ 419. Sub-band 415b is a candidate for exclusion.

A possible multipath discrimination process can be outlined as follows: For each sub-band 415a-c a timing process is performed, and the interpolation step provides, for each sub-band, an estimate of the position and of the amplitude of the correlation peak. The full band is processed in the same manner and amplitude and position for the full-band correlation peak are obtained as well. Since sub-band inner products are partial sums of the complete inner product, the latter can be obtained directly from the sub-band inner products without iterating on the vector factors again. Therefore, full amplitude and position can be computed at the only extra cost of one interpolation which, in terms of complexity, is much less demanding. To make a comparison on a real example, interpolation from 3 points works well with a parabolic fit, which takes a few tens of real valued multiplications. The inner products for the full band can take as much as 3 vectors×8 symbols×4096 samples≈100'000 complex valued multiplications and addition, i.e. 400'000 real valued complex multiplications plus 200'000 real valued additions. Therefore, the addition of the sub-band analysis contributes negligibly to the computation load.

In the absence of phase inversion within the band, the absolute interpolated amplitudes of sub-bands essentially sum up to the absolute interpolated amplitude of the full band. This is because when there is no phase inversion, since the channel is slowly moving versus frequency, its phase derivative is almost constant. Then the interpolated delay corresponds to a projection vector aligned with the received signal. When a phase inversion is present, absolute amplitudes do not sum up anymore, and the sum of absolute amplitude of sub bands will be higher than the absolute amplitude of full band. The same applies to sub divisions of sub bands. This allows detecting the occurrence of such a phase inversion based on the amplitude of the received signal in the sub-bands.

The sub-band processing of the invention is highly reliable because it takes benefit of the processing gain of the system. With 2 sub bands, the processing gain is just 3 dB lower than the processing gain of the full band. The processing gain of the full band is between 15 dB and 36 dB, depending on spreading factor. This method has proven superior to known blind channel equalization methods, in particular for long-range transmission where LoRa signal can be several dB below the noise floor.

It is worth remarking that, given the time-frequency duality of LoRa signal, the sub-band division of this method is equivalent to a time division. Referring for example to FIG. 8, it is apparent that the sub-bands 415a and 415b split each of the symbols 411a-f into two sub-symbols of same size. Indeed the algorithm of the invention could be also described in term of sub-symbol, wherein each of the received symbols 411a-411f is divided in sub-symbols, and the multiplication of the projection vectors by the received vector is carried out in each of the sub-symbols.

The invention claimed is:

1. Method of timing, in a receiver, a radio signal generated in and transmitted from a transmitter, the radio signal comprising a series of frequency chirps, the method including:
    receiving the radio signal from the transmitter;
    synthesizing projection vectors comprising a series of frequency chirps that are a complex-conjugate image of those comprised in the radio signal the projection vectors being time-shifted relative to one another by determined shift intervals of time;
    computing a projection of the received radio signal by multiplying the received radio signal by the projection vectors and accumulating inner products of corresponding samples;
    interpolating the projection of the received radio signal to determine a peak time shift,
    wherein the projection vectors comprise a plurality of chirps and the step of computing a projection spans a plurality of chirps in the received radio signal,
    the method further comprising determining a clock correspondence between a local time reference comprised in the receiver and a transmitter's time reference based on the received radio signal and compensating frequency slope and phase of the chirps in the projection vectors based on the clock correspondence.

2. The method of claim 1; wherein a bandwidth of the received signal is partitioned into sub-bands, the multiplication of the projection vectors by the received radio signal is carried out in each of the sub-bands.

3. The method of claim 1 the steps of multiplying the projection vectors by the received radio signal is carried on the stored digital representation.

4. The method of claim 1, wherein the projection vectors include one first projection vector aligned with the received radio signals, one second projection vector advanced relative to the first vector, one third vector delayed relative to the first projection vector.

5. The method of claim 1, comprising selecting, in the radio signal, a preamble including a plurality of identical frequency chirps.

6. The method of claim 1, wherein a phase of one of said projection vectors has discontinuities at each chirp boundary.

7. Method of timing, in a receiver, a radio signal generated in and transmitted from a transmitter, the radio signal comprising a series of frequency chirps, the method including:
   receiving the radio signal from the transmitter;
   synthesizing projection vectors comprising a series of frequency chirps that are a complex-conjugate image of those comprised in the radio signal the projection vectors being time-shifted relative to one another by determined shift intervals of time;
   computing a projection of the received radio signal by multiplying the received radio signal by the projection vectors and accumulating inner products of corresponding samples;
   interpolating the projection of the received radio signal to determine a peak time shift,
   wherein the projection vectors comprise a plurality of chirps and the step of computing a projection spans a plurality of chirps in the received radio signal,
   wherein a bandwidth of the received signal is partitioned into sub-hands, the multiplication of the projection vectors by the received radio signal is carried out in each of the sub-bands,
comprising a combination between sub-band results and fill, band result, including rejecting any of the peak time shifts, based on an estimated multipath impact.

8. The method of claim 7, wherein the multipath impact is estimated based on amplitudes of the received signal in the sub-bands.

* * * * *